R. J. LEACH.
GAS ENGINE.
APPLICATION FILED AUG. 2, 1909.

958,881.

Patented May 24, 1910.

WITNESSES:
Dennis J. Reagan
Julia Ricci

INVENTOR:
Raymond Jacob Leach
Charles H. Luther
ATTORNEY.

UNITED STATES PATENT OFFICE.

RAYMOND JACOB LEACH, OF SEEKONK, MASSACHUSETTS.

GAS-ENGINE.

958,881.   Specification of Letters Patent.   Patented May 24, 1910.

Application filed August 2, 1909. Serial No. 510,888.

*To all whom it may concern:*

Be it known that I, RAYMOND JACOB LEACH, a citizen of the United States, residing at Seekonk, in the county of Bristol and State of Massachusetts, have invented a new and useful Improvement in Gas-Engines, of which the following is a specification.

My invention has reference to an improvement in gas engines and more particularly to an improvement in two-cycle gas engines.

The object of my invention is to improve the construction of a two-cycle gas engine whereby the operation of the engine is improved and the speed and power of the engine materially increased.

My invention consists in the peculiar and novel construction of a two-cycle gas engine having details of construction, as will be more fully set forth hereinafter and claimed.

Figure 1:
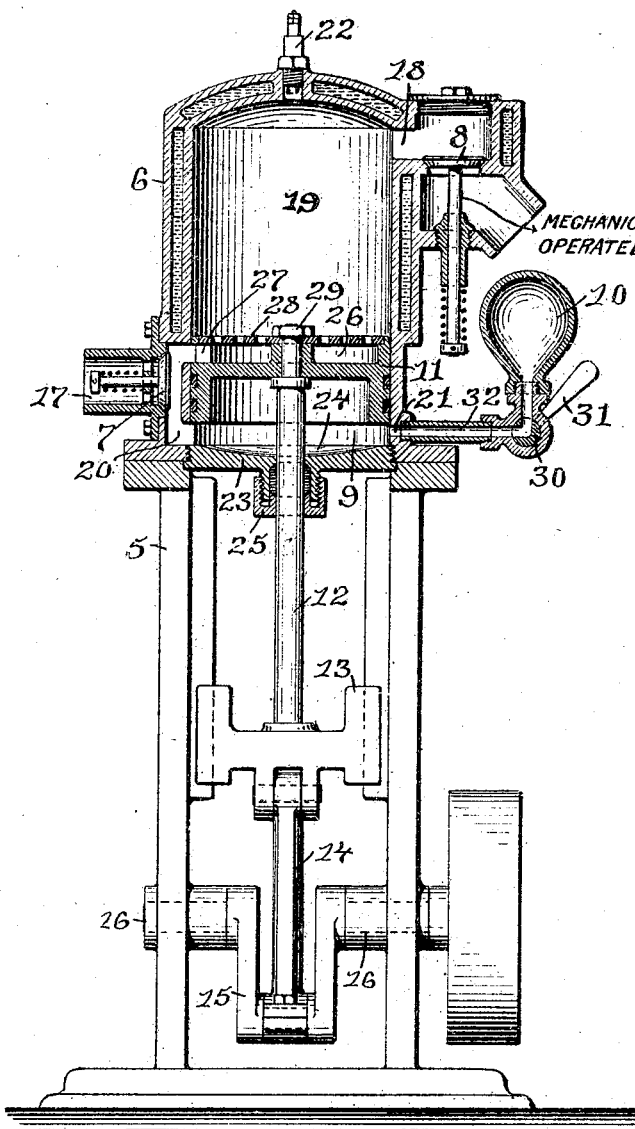
Figure 2:
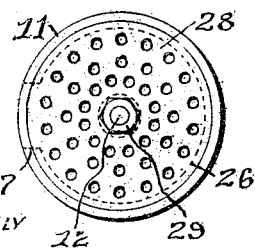
Figure 3:
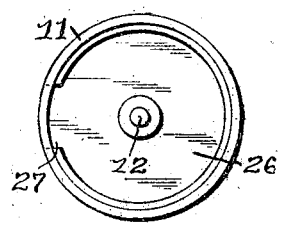

Figure 1 is a vertical sectional view through my improved two-cycle gas engine, showing the piston at the end of its downward stroke. Fig. 2 is an end view of the piston removed from the engine and showing the perforated plate in the end of the piston, and Fig. 3 is an end view of the piston with the perforated plate removed and showing the circular chamber in the end of the piston.

In the drawings 5 indicates the frame of the engine, 6, the cylinder, 7, the intake valve, 8, the exhaust valve, 9, the compression chamber, 10, the auxiliary compression chamber, 11, the piston, 12, the piston rod, 13, the cross-head, 14, the connecting rod, 15, the crank and 16, the crank shaft rotatably supported in bearings on the frame 5, in the usual way. The cylinder 6, has a lower intake port 17, controlled by the intake valve 7, an upper exhaust port 18, controlled by the exhaust valve 8, an explosion chamber 19, a by-pass 20 indirectly connecting the compression chamber 9, with the explosion chamber 19, when the piston is at the end of its downward stroke, a duct 21, extending through the side of the cylinder 6, into the compression chamber 9, and a spark plug 22, extending through the upper end of the cylinder into the explosion chamber 19. The compression chamber 9, is formed by the walls of the lower end of the cylinder 6, the lower end of the piston 11, and a head 23, having a dished upper face 24, and a packing box 25, through which the piston rod 12, extends, as shown in Fig. 1. The head 23, is preferably secured to the lower end of the cylinder 6, by screwing the same into the cylinder end, as shown in Fig. 1. The piston 11, is constructed to have a circular concentric chamber 26, in the top, a port 27, extending from the chamber 26, outward through the side of the piston and a perforated plate 28, forming the top of the chamber 26, and secured to the top of the piston by a nut 29, on the end of the piston rod 12, which extends through a central hole in the plate. The nut 29, also secures the piston 11, to the piston rod 12, as shown in Fig. 1. The auxiliary compression chamber 10, is preferably in the form of a hollow globular body connected to a valve 30, having a lever 31 and the valve 30, is connected by a pipe 32, to the duct 21, in the side of the cylinder 6, as shown in Fig. 1.

In the operation of my improved two-cycle gas engine, an upward stroke of the piston 11, compresses the previous charge of gas in the explosion chamber 19, and simultaneously a charge of gas is drawn through the intake port 17, and the by-pass 20 into the compression chamber 9, and when used for a low speed engine with the valve 30, open, through the duct 21, the pipe 32, the valve 30 and into the auxiliary compression chamber 9. The gas is then exploded in the explosion chamber 19, by the spark plug 22, in the usual way, driving the piston 11, downward and simultaneously compressing the gas in the compression chamber 9, and the auxiliary compression chamber 10. The exhaust valve 8, now opens and the burned gases are exhausted through the exhaust port 18, and the exhaust valve then closes. At the end of the downward stroke of the piston 11, the port 27, in the piston coincides with the upper end of the by-pass 20, as shown in Fig. 1, and the compressed gas is forced by expansion from the compression chamber 9, and the auxiliary compression chamber 10, through the by-pass 20, the port 27, and the circular chamber 26, in the piston and out through the perforations in the plate 28, into the explosion chamber 19.

When the engine is used as a high speed engine the valve 30, is closed by moving the lever 31 downward thus cutting out the auxiliary compression chamber 10. This reduces the compression area and the compression of the gases is materially increased in the compression chamber 9, which increased compression forces the gases at a greater increased speed from the compression chamber 9, into the explosion chamber 19, thereby increasing the speed of the engine. Any variation intermediate a low or high speed may be obtained by varying the position of the valve 30, between its extreme open or closed position. The peculiar and novel construction of the chamber in the piston and the perforated plate gives a better mixture of the gases and a more perfect combustion is obtained.

Having thus described my invention, I claim as new and desire to secure by Letters Patent:—

1. In a two-cycle gas engine, in combination, a cylinder having an exhaust port at the upper end on the side and a head secured to the lower end, a piston in the cylinder dividing the same into a compression chamber and an explosion chamber, a by-pass in the side of the cylinder at the lower end, extending from the compression chamber upward and inward, in a position to coincide with a port in the piston when the piston is at the downward limit of its stroke, an intake port at the lower end of the cylinder extending into the by-pass, an automatic valve controlling the intake port, a mechanically operated valve controlling the exhaust port, a piston having a concentric circular chamber in its upper end, a port extending from the circular chamber through the side of the piston in a position to coincide with the upper end of the by-pass when the piston is at the downward limit of its stroke, a circular perforated plate recessed into the piston and forming the top of the circular chamber, a shouldered piston rod having a reduced portion screw-threaded on the end and extending through a central hole in the piston and a central hole in the perforated plate and a nut on the screw-threaded end of the piston rod engaging with the perforated plate.

2. In a two-cycle gas engine, in combination, a cylinder having a closed upper end, an internally screw-threaded lower end, walls forming an exhaust port at the upper end on the side, a by-pass in the side extending from the lower end upward and inward and an intake port on the side extending into the by-pass, all formed integral, an automatic valve controlling the intake port, a mechanically operated valve controlling the exhaust port, an externally screw-threaded head closing the lower end of the cylinder, the upper end of the cylinder constituting an explosion chamber and the lower end a compression chamber connected with the by-pass, a piston having a concentric circular chamber in its upper end, a port extending from the circular chamber through the side of the piston and adapted to coincide with the upper end of the by-pass in the cylinder when the piston is at the downward limit of its stroke, a circular perforated plate recessed into the piston and forming the top of the circular chamber, a shouldered piston rod extending through a stuffing box on the head closing the lower end of the cylinder and having a reduced portion screw-threaded on the end and extending through a central hole in the piston and a central hole in the perforated plate and a nut on the screw-threaded end of the piston rod engaging with the perforated plate.

In testimony whereof, I have signed my name to this specification in the presence of two subscribing witnesses.

RAYMOND JACOB LEACH.

Witnesses:
LEON E. DANFORTH,
JULIA RICCI.